US006495222B1

(12) United States Patent
Mosser et al.

(10) Patent No.: US 6,495,222 B1
(45) Date of Patent: Dec. 17, 2002

(54) MOISTURE REDUCTION ASSEMBLY

(75) Inventors: Drew Donald Mosser, Imler, PA (US); David L. Crossman, Milford, MI (US); Robert T. Babcock, Canton, MI (US)

(73) Assignee: Visteon Global tech., Inc., Dearborn, MI (US)

( * ) Notice: Subject to any disclaimer, the term of this patent is extended or adjusted under 35 U.S.C. 154(b) by 0 days.

(21) Appl. No.: 09/511,519

(22) Filed: Feb. 23, 2000

(51) Int. Cl.[7] ........................ B29D 22/00; B29D 23/00; B32B 1/08; F21V 33/00; F21V 29/00

(52) U.S. Cl. .................... 428/34.1; 428/34.4; 428/36.9; 428/36.92; 362/96; 362/294; 362/345; 362/546; 362/547

(58) Field of Search ................................ 362/351, 509, 362/539, 343, 263, 265, 293, 298, 305, 538, 297, 346, 516, 517, 518, 806, 96, 294, 345, 546, 547; 428/34.1, 34.4, 36.9, 36.92

(56) References Cited

U.S. PATENT DOCUMENTS 4,750,093 A 6/1988 Bals et al. .................... 362/80
4,796,163 A 1/1989 Dressler ..................... 362/547
5,915,695 A * 6/1999 Wisocki et al. ............. 273/362
6,132,068 A * 10/2000 Katsumata .................. 362/351
6,203,177 B1 * 3/2001 Watanabe et al. ........... 362/351

FOREIGN PATENT DOCUMENTS

DE 0 571 090 A1 4/1993
DE 42 17 339 A1 12/1993
JP 57031979 A * 2/1982 ............ C09K/5/00
WO 97/27042 * 7/1997 ........... B29C/70/58

* cited by examiner

*Primary Examiner*—Harold Pyon
*Assistant Examiner*—Michael C. Miggins
(74) *Attorney, Agent, or Firm*—Visteon Global Tech., Inc.

(57) ABSTRACT

A moisture reduction assembly 10 for use in a vehicle headlamp 12 which operatively reduces and/or substantially eliminates moisture 22 within the headlamp 12. The moisture reduction assembly 10 includes a selectively energizable bulb 18 and a bulb shield 16. The bulb shield 16, in one non-limiting embodiment, receives and/or is lined with a heat activated catalyst 20 which is heated by the selectively energizable bulb 18 and which, when heated, chemically converts the contained moisture 22 to at least one non-condensing gas. The catalyst 20 may also be selectively applied to the bulb 18. In another non-limiting embodiment, a desiccant member 30 is disposed within and/or upon the bulb 18 or disposed within the bulb shield 16.

16 Claims, 2 Drawing Sheets

MOISTURE REDUCTION ASSEMBLY

(1) FIELD OF THE INVENTION

This invention relates to a moisture reduction assembly and more particularly, to a moisture reduction assembly which is adapted to be operatively placed within a vehicle headlamp assembly and which is further adapted to allow light to be selectively generated in a desired manner while concomitantly reducing moisture within the headlamp assembly.

(2) BACKGROUND OF THE INVENTION

Bulb assemblies are typically and selectively placed within vehicle headlamps and/or headlamp assemblies and are operatively adapted to generate light in a desired manner. More particularly, each bulb assembly typically includes a bulb which is selectively energized and which, upon such selective energization, emits light. The bulb assembly further includes a bulb shield which is adapted to absorb some of the light which emanates from the energized bulb, effective to substantially prevent the light from directly "shining" into the eyes of an oncoming driver.

While these bulb assemblies effectively generate and emit light, they also generate heat which typically causes the headlamps to be repeatedly heated and cooled (i.e., when the vehicle is parked and the bulb assemblies are deactivated, the headlamps cool), thereby causing undesirable moisture and/or condensation to be drawn into these headlamps or headlamp assemblies. Particularly, this moisture and/or condensation is unsightly and may potentially damage the various electrical components and/or elements which are contained within these headlamps.

To reduce or eliminate this moisture and/or condensation, a commercially available desiccant member or material has been used in some of these headlamps and is somewhat effective to absorb some of the contained moisture. While the desiccant member desirably absorbs some of the contained moisture, its operating life is relatively short and the use of such a desiccant member requires relatively frequent removal and replacement of each of the vehicle's headlamps.

It is therefore desirable to substantially eliminate and/or reduce the amount of moisture and/or condensation which is present within a headlamp, while concomitantly allowing the contained bulb assembly to generate and emit desired light, and to do so in a manner which does not require frequent service of the vehicle or the headlamp. The present invention addresses these and other needs.

SUMMARY OF THE INVENTION

It is a first object of the present invention to provide a moisture reduction assembly which allows light to be selectively generated and emitted by a headlamp while concomitantly reducing and/or substantially eliminating moisture and/or condensation which is present within the headlamp.

It is a second object of the present invention to provide a moisture reduction assembly which is operatively deployed within a headlamp, which selectively generates and emits light, and which produces heat which is used to reduce and/or substantially eliminate moisture and/or condensation within the headlamp.

According to a first aspect of the present invention, a moisture reduction assembly is provided. The moisture reduction assembly includes a bulb; and a bulb shield which includes a desiccant drying member which is effective to reduce and/or substantially eliminate moisture within a headlamp.

According to a second aspect of the present invention, a method for reducing moisture within a headlamp is provided. The method includes the step of generating heat; providing a heat activated catalyst; and using the generated heat along with a heat activated catalyst, to convert the moisture into non-condensing gases.

These and other objects, features, and advantages of the present invention will become apparent from the following detailed description of the preferred embodiment of the invention and by reference to the following drawings.

DETAILED DESCRIPTION OF THE PREFERRED EMBODIMENT OF THE INVENTION

Figure 1:
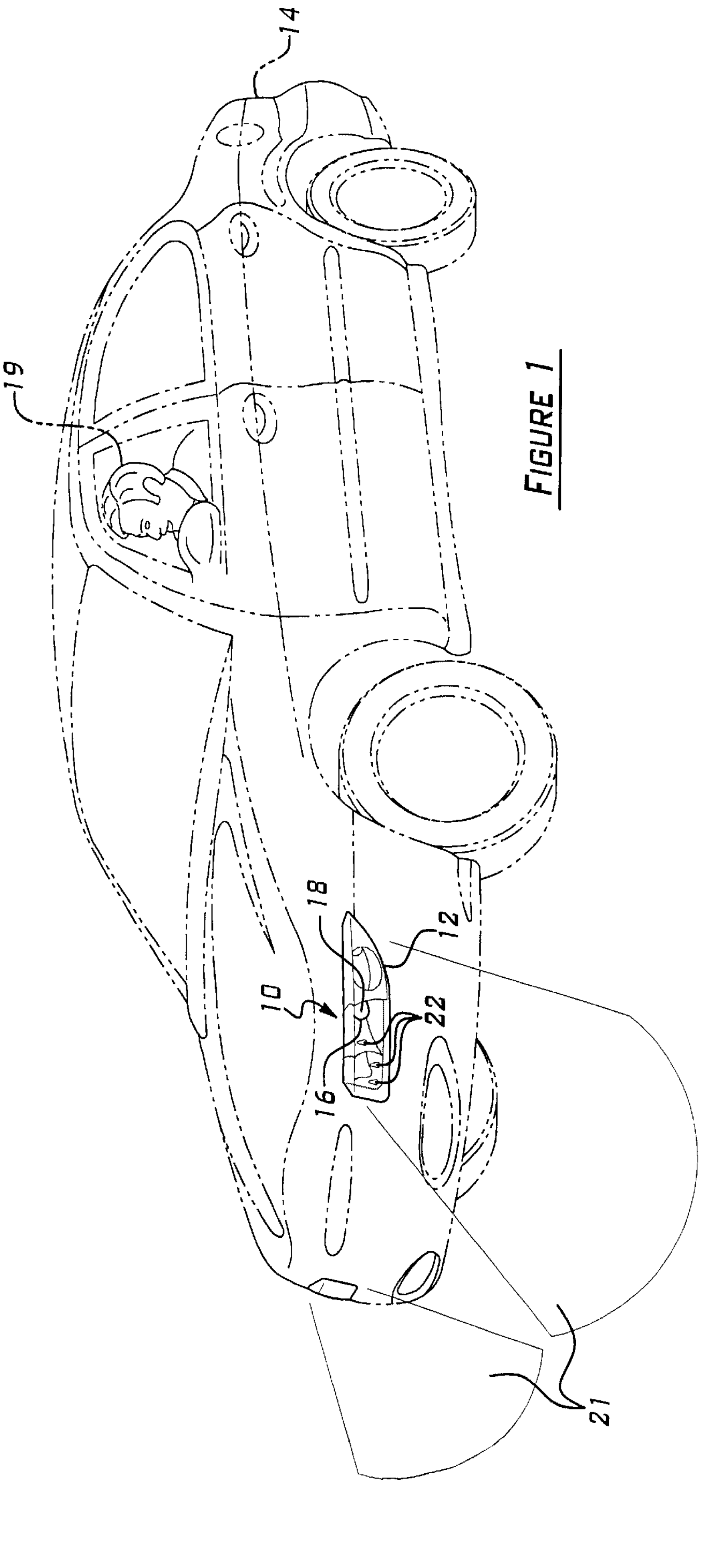
FIG. 1 is a perspective view of a vehicle incorporating a moisture reduction assembly which is made in accordance with the teachings of the preferred embodiment of the invention.

Referring now to FIGS. 1–4, there is shown a bulb assembly 10 which is made in accordance with the teachings of the preferred embodiment of the invention, which is operatively deployed and contained within a headlamp 12 contained within a vehicle 14, and which, as more fully delineated below, may selectively function as a moisture reduction assembly.

Particularly, bulb assembly 10 includes a bulb shield 16 and a selectively energizable and selectively light emitting and/or light generating bulb 18. As should be appreciated, bulb 18 is selectively coupled, by an operator 19 of vehicle 14, to a source of electrical energy (not shown) and generates and emits light 21. The generated light 21 is then emitted from the headlamp 12. Bulb shield 16, as best shown in FIGS. 2 and 3, is substantially "cup-shaped", having a relatively contoured and smooth interior surface 17 which forms a cavity which, as shown best in FIG. 1, operatively receives bulb 18 and absorbs and/or reflects the portion of the generated light 21 which otherwise is directly communicated to the eyes of a driver of a vehicle which passes in close proximity to and which is travelling in the opposite direction of vehicle 14.

According to the teachings of the preferred embodiment of the invention, a heat activated catalyst 20 is applied to the surface 17 of the bulb shield 16, thereby "lining" the bulb shield cavity and allowing the catalyst containing bulb shield 16 to function as a lamp moisture reduction assembly. The catalyst 20, upon receipt of the heat which is generated by the energized bulb 18, chemically alters or "cracks" the moisture 22 which is present and contained within the headlamp 12. Particularly, the heat activated catalyst 20 chemically converts the moisture 22 into at least one non-condensing gas, such as carbon dioxide and hydrogen. The at least one non-condensing gas easily "flows out of" or exits the headlamp 12. In this manner, the moisture 22 is substantially eliminated from the interior of the headlamp 12.

Catalyst 20 may also be selectively applied to and disposed upon the bulb 18, thereby allowing the bulb 18 to function as a lamp moisture reduction assembly. The catalyst containing bulb 18 may also be selectively used in combination with the catalyst containing or catalyst lined bulb shield 16 to further increase the amount of contained moisture 22 which may be eliminated from the interior of headlamp 12 and, in this non-limiting alternate embodiment, the catalyst containing bulb shield 16 and the catalyst containing bulb 18 cooperatively and/or individually form a lamp moisture reduction assembly.

Figure 2:
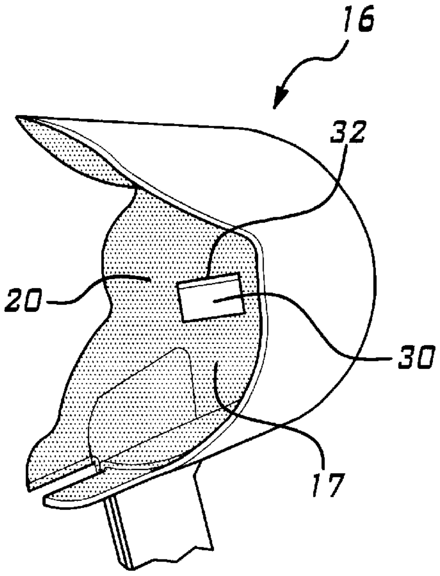
FIG. 2 is a fragmented perspective view of a portion of the moisture reduction assembly which is shown in FIG. 1.
Figure 3:
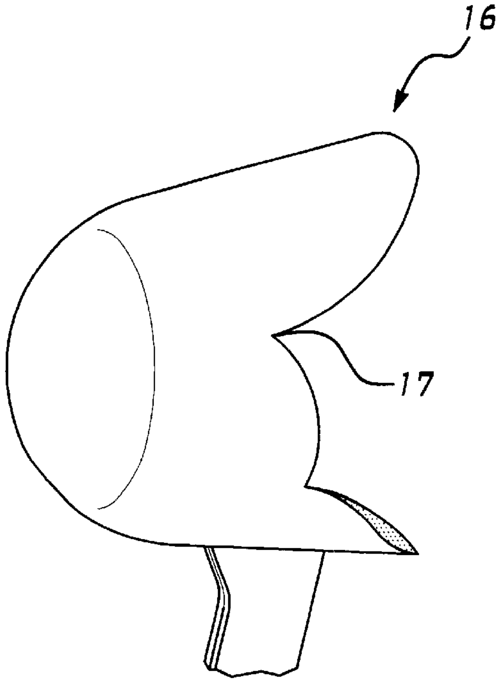
FIG. 3 is a fragmented side view of the portion of the moisture reduction assembly which is shown in FIG. 2.
Figure 4:
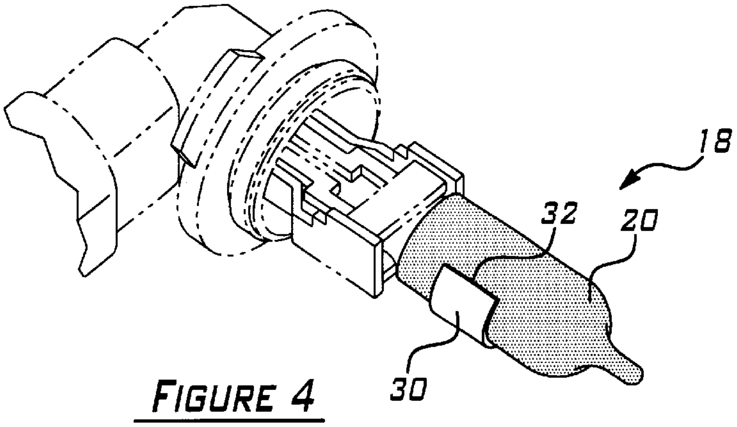
FIG. 4 is a perspective view of a portion of the moisture reduction assembly which is shown in FIG. 1.

While catalyst 20 may be applied to the bulb 18 and/or bulb shield 16 by use of conventional adhesive materials, in one non-limiting embodiment, the catalyst 20 is mixed with a binding agent, such as and without limitation black paint, and the paint or binding agent containing catalyst is applied upon the outer surface of the bulb 18 and the interior surface 17 of the bulb shield 16, in the manner shown by way of example and without limitation in FIGS. 2–4. The black paint increases the amount of heat which is generated by the bulb 18 and further allows greater amounts of moisture 22 to be eliminated by activating substantially all of the contained catalyst 20. In one non-limiting embodiment of the invention, the catalyst 20 comprises silver-nitrate, although other material may be utilized. The contained catalyst 20 may be repeatedly activated and has a relatively long operating life, thereby obviating the need for frequent disassembly and service of headlamp 12.

In yet another non-limiting embodiment of the invention, a conventional desiccant member 30 may be mounted and/or disposed directly upon bulb 18 or surface 17, by way of conventional adhesive material 32, thereby allowing the heat which is generated by the bulb 18 to "clean" or eliminate the moisture within the desiccant member 30 and thereby prolonging or increase the operating life of the desiccant member 30 and substantially reducing the amount of service which may be required of headlamp 12. In this alternate non-limiting embodiment, the desiccant member 30 or the desiccant containing bulb shield 16 or bulb 18 respectively functions as a lamp moisture reduction assembly. Desiccant member 30 may be used in combination with the catalyst 20 which is applied and operatively used in the foregoing manner.

It is to be understood that the invention is not limited to the exact construction or method which has been described, but that various changes and modifications may be made without departing from the spirit and the scope of the invention as is delineated within the following claims.

What is claimed is:

1. An assembly which reduces an amount of moisture which is present in a headlamp assembly having a selectively activated bulb which generates an amount of heat, said assembly comprising a bulb shield having at least a portion which is painted with a mixture of a heat activated catalyst and black paint, said mixture receiving said amount of heat from said selectively activated bulb and said black paint, upon said reception of said amount of heat, being effective to activate all of said heat activated catalysts thereby, causing all of said heat activated catalyst to convert at least some of said amount of moisture to at least one non-condensing gas.

2. The assembly of claim 1 wherein said heat activated catalyst comprises silver nitrate.

3. The assembly of claim 1 wherein said at least one non-condensing gas comprises carbon dioxide.

4. The assembly of claim 1 wherein said mixture is further deployed upon said bulb, thereby further increasing said heat of said bulb and thereby increasing said conversion of said moisture into said at least one non-condensing gas.

5. The assembly of claim 1 wherein said at least one non-condensing gas comprises hydrogen.

6. A moisture reduction assembly for use within a vehicle headlamp assembly having a bulb which generates light and heat, said moisture reduction assembly comprising:

a bulb shield-having an outer surface and a cavity, said cavity being lined with a heat activated catalyst, and said outer surface of said bulb shield further having a certain amount of said heat activated catalyst deployed thereon.

7. The moisture reduction assembly of claim 6 wherein said heat activated catalyst comprises silver nitrate.

8. The moisture reduction assembly of claim 7 wherein said heat activated catalyst is mixed with a certain binder and said mixture is applied to said bulb shield.

9. The moisture reduction assembly of claim 8 wherein said binder comprises black paint.

10. The moisture reduction assembly of claim 9 wherein said mixture is applied to said bulb.

11. A method for reducing moisture within a headlamp comprising the steps of:

providing a heat activated catalyst;

providing a certain amount of black paint;

deploying said heat activated catalyst and said certain amount black paint within said headlamp;

generating heat; and using said generated heat in combination with said black paint to activate substantially all of said heat activated catalyst in order to reduce said moisture within said headlamp by converting said moisture into at least one non-condensing gas.

12. The method of claim 11 further comprising the steps of:

mixing said provided heat activated catalyst with said black paint; and applying said mixture to a portion of said headlamp.

13. The method of claim 12 wherein said headlamp includes a bulb shield and wherein said portion of said headlamp comprises said bulb shield.

14. The method of claim 12 wherein said headlamp includes a bulb and wherein said portion of said headlamp comprises said bulb.

15. The method of claim 12 wherein said catalyst comprises silver nitrate.

16. The method of claim 11 wherein said headlamp includes a bulb shield and wherein said step of using said generated heat to reduce said moisture includes the steps of:

providing a desiccant member; and mounting said desiccant member upon said bulb shield.

* * * * *